United States Patent
Iwasa et al.

(10) Patent No.: US 9,054,606 B2
(45) Date of Patent: Jun. 9, 2015

(54) DRIVING DEVICE AND DRIVING CIRCUIT FOR A VIBRATION ACTUATOR

(71) Applicant: CANON KABUSHIKI KAISHA, Tokyo (JP)

(72) Inventors: Takeshi Iwasa, Tokyo (JP); Kenichi Kataoka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 159 days.

(21) Appl. No.: 13/911,190

(22) Filed: Jun. 6, 2013

(65) Prior Publication Data

US 2013/0334988 A1    Dec. 19, 2013

(30) Foreign Application Priority Data

Jun. 15, 2012  (JP) ................. 2012-135647

(51) Int. Cl.
*H01L 41/04* (2006.01)
*H02N 2/14* (2006.01)

(52) U.S. Cl.
CPC . *H02N 2/14* (2013.01); *H02N 2/142* (2013.01)

(58) Field of Classification Search
USPC ......................................... 318/116, 114, 128
See application file for complete search history.

(56) References Cited

U.S. PATENT DOCUMENTS

| | | | |
|---|---|---|---|
| 5,004,964 A | 4/1991 | Kataoka et al. | |
| 5,459,370 A | 10/1995 | Kataoka | |
| 6,031,316 A | 2/2000 | Kataoka | |
| 6,049,156 A | 4/2000 | Yamamoto et al. | |
| 6,054,795 A | 4/2000 | Yamamoto et al. | |
| 6,608,426 B2 | 8/2003 | Hayashi et al. | |
| 6,635,977 B2 | 10/2003 | Kataoka et al. | |
| 6,954,022 B2 | 10/2005 | Kataoka | |
| 7,129,618 B2 | 10/2006 | Fujimoto et al. | |
| 2011/0204830 A1* | 8/2011 | Kim et al. | 318/114 |
| 2013/0241446 A1 | 9/2013 | Iwasa et al. | |
| 2013/0257223 A1 | 10/2013 | Kataoka | |
| 2013/0257333 A1 | 10/2013 | Kataoka | |

FOREIGN PATENT DOCUMENTS

| | | |
|---|---|---|
| JP | 8-130891 A | 5/1996 |
| JP | 2000-287467 A | 10/2000 |
| JP | 2003-153559 A | 5/2003 |
| JP | 2005-223994 A | 8/2005 |
| JP | 2010-136527 A | 6/2010 |

* cited by examiner

*Primary Examiner* — Karen Masih
(74) *Attorney, Agent, or Firm* — Fitzpatrick, Cella, Harper & Scinto

(57) ABSTRACT

A driving device, including a drive signal generating section configured to variably control a frequency or an amplitude of an application voltage to a vibration member, includes a variable period setting section configured to output a value of a PWM period, the set value being set so that an average value of PWM periods in one target period of the application voltage is one fraction of an integer number of the target period by variably adjusting the PWM periods in an aperiodic manner; a drive waveform information output section; and a variable period PWM signal generating section configured to generate a PWM signal based on the set value of the PWM period output from the variable period setting section and drive waveform information of the application voltage, wherein the drive signal generating section is a digital circuit.

9 Claims, 8 Drawing Sheets

DRIVING DEVICE AND DRIVING CIRCUIT FOR A VIBRATION ACTUATOR

BACKGROUND OF THE INVENTION

1. Field of the Invention

The present invention relates to a driving device and a driving circuit for a vibration actuator, and more particularly, to a driving device and a driving circuit for a vibration actuator which are configured such that an undesired vibration can be suppressed and a stable rotation of the vibration actuator can be obtained.

2. Description of the Related Art

An ultrasonic motor (vibration wave driving device) as a type of vibration actuator is mounted in a copier, an interchangeable camera lens, or the like. Along with the recent enhancement in device performance and reduction in power consumption, demands have been made for higher accuracy of rotation and higher efficiency. The feature of the ultrasonic motor is lower-velocity and higher-torque driving than an electromagnetic motor as typified by a DC brushless motor, but there still exists a problem to meet the above-mentioned requirements. For example, depending on a contact state between a stator formed of an elastic member and a piezoelectric element and a rotor formed of a moving member, the behavior may become unstable during rotation to cause an undesired vibration, which is responsible for noise, velocity fluctuations, or uneven wear.

Countermeasures for noise, velocity fluctuations, and uneven wear depending on the contact state are proposed in Japanese Patent Application Laid-Open No. 2005-223994 as a method of superimposing an aperiodic signal on an AC voltage for motor driving. Specifically, the width of a pulse signal for generating the AC voltage to be applied to the vibration actuator is changed in an aperiodic manner.

Otherwise, Japanese Patent Application Laid-Open No. 2003-153559 proposes a method of reducing a distortion factor of the AC voltage for motor driving. Specifically, Japanese Patent Application Laid-Open No. 2003-153559 proposes the concept that a driving sine wave is subjected to frequency variable pulse width modulation (PWM) to have a fixed phase relationship therebetween and a low-distortion sine wave is thereby obtained.

SUMMARY OF THE INVENTION

The related art driving device for a vibration actuator has, however, problems of limited effects and applications because of the following reasons.

The configuration disclosed in Japanese Patent Application Laid-Open No. 2005-223994 does not always satisfy the needs for highly-accurate drive control at low cost. The period of superimposing an aperiodic signal is equal to the period of the AC voltage for motor driving, and hence a signal having an arbitrary frequency or amplitude cannot be superimposed. Thus, this configuration is less versatile.

Japanese Patent Application Laid-Open No. 2003-153559 proposes only the concept, and the study made by the inventors of the present invention poses many problems to be solved, such as the difficulty in ensuring the frequency resolution when the driving device is mounted in a digital manner.

In the variable-period pulse width modulation (PWM), the distortion factor is deteriorated when an arbitrary signal sampled at a fixed period is superimposed.

In view of the above-mentioned problems, an exemplary embodiment of the present invention relates to a driving device and a driving circuit for a vibration actuator, which are configured to perform low-distortion sine wave driving and perform highly-accurate drive control at low cost.

According to an exemplary embodiment of the present invention, there is provided a driving device for a vibration actuator, including an AC voltage applying section including a drive signal generating section configured to variably control at least one of a frequency and an amplitude of an application voltage to be applied to a vibration member, the drive signal generating section including: a variable period setting section configured to output a value of a PWM period, the value being set so that an average value of PWM periods in one period of a target period of the application voltage is to be one fraction of an integer number of the target period by variably adjusting the PWM periods in an aperiodic manner; a drive waveform information output section configured to output drive waveform information of the application voltage, the drive waveform information being generated with use of fixed phase information for a sine wave; and a variable period PWM signal generating section configured to generate a PWM signal having a variable period based on the set value of the PWM period output from the variable period setting section and the drive waveform information output from the drive waveform information output section, wherein the drive signal generating section is a digital circuit.

According to an exemplary embodiment of the present invention, there is also provided a driving circuit for a vibration actuator, including an AC voltage applying section including a drive signal generating section configured to variably control at least one of a frequency and an amplitude of an application voltage to be applied to a vibration member, the drive signal generating section including: a variable period setting section configured to output a value of a PWM period, the set value being set so that an average value of PWM periods in one target period of the application voltage is one fraction of an integer division of the target period by variably adjusting the PWM periods in an aperiodic manner; a drive waveform information output section configured to output drive waveform information of the application voltage, the drive waveform information being generated with use of fixed phase information for a sine wave; and a variable period PWM signal generating section configured to generate a PWM signal having a variable period based on the set value of the PWM period output from the variable period setting section and the drive waveform information output from the drive waveform information output section, wherein the drive signal generating section is a digital circuit.

Further features of the present invention will become apparent from the following description of exemplary embodiments with reference to the attached drawings.

DESCRIPTION OF THE EMBODIMENTS

The modes for carrying out the present invention are now described by way of the following embodiments.

The present invention is not intended to be limited to the following embodiments.

First Embodiment

A first embodiment of the present invention relates to exemplary configurations of a driving device and a driving circuit for a vibration actuator to which the present invention is applied.

The driving device for a vibration actuator according to this embodiment includes a vibration member configured to excite a vibration wave when applied with an AC voltage from an AC voltage applying section, and a moving member configured to be brought into contact with the vibration member or indirectly connected to the vibration member, the moving member being movable relative to the vibration member by a frictional force generated by the vibration wave. For example, a metal or ceramic elastic member is vibrated by utilizing a resonance phenomenon in a natural vibration mode, and a rotor in contact with the elastic member is relatively moved. A piezoelectric element is mainly used as a source for generating an exciting force for excitation.

A vibration actuator is capable of generating an exciting force when an AC voltage having the same frequency as an exciting frequency is input. The structure of a vibration actuator using a piezoelectric element, the rotor rotation principle, and the control principle are known technologies, and hence its detailed description is omitted in this embodiment. The following description assumes the use of a ring vibration actuator having a typical four-phase electrode configuration with ±A phases and ±B phases.

Referring to FIGS. 1, 2, 3, 4, 5A, 5B, and 5C, the configuration and operation of a driving device for a vibration actuator and a driving circuit therefor according to this embodiment are described below.

Figure 1:
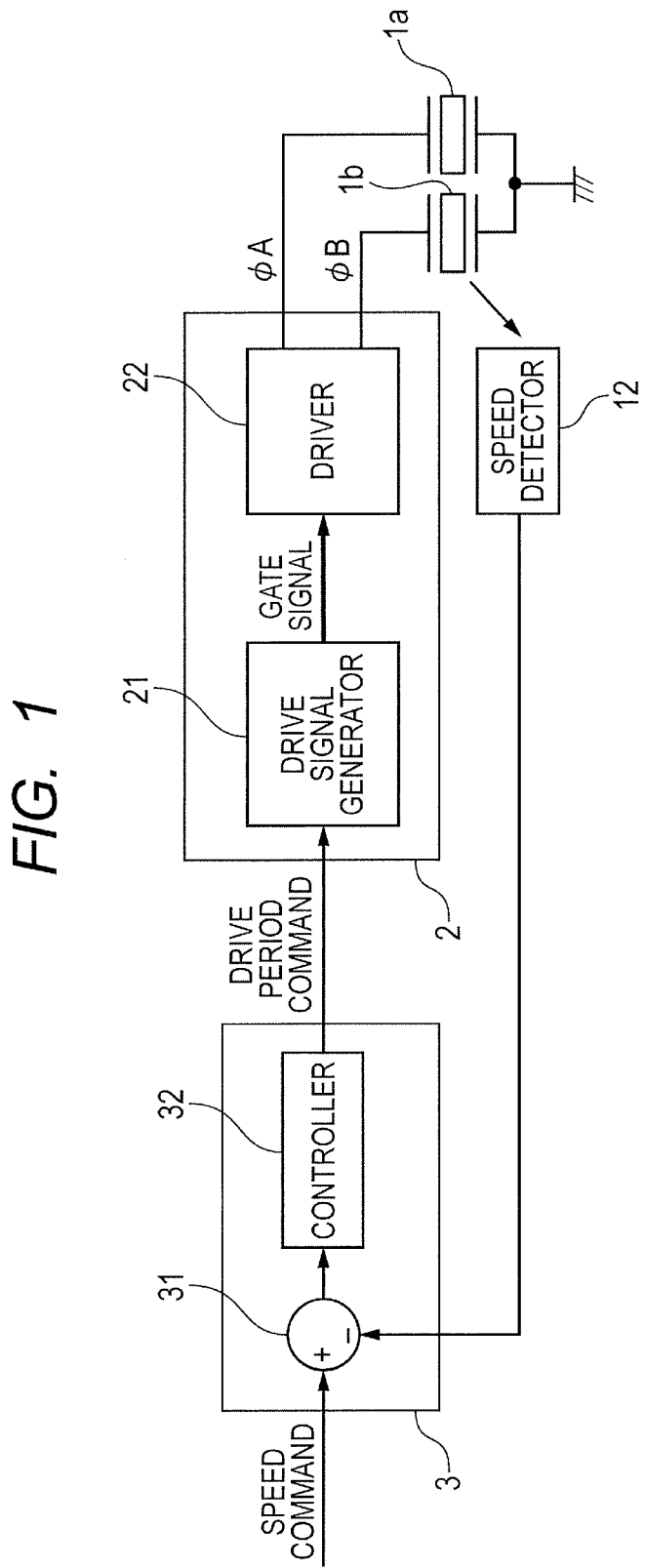
FIG. 1 is a block diagram illustrating an exemplary configuration of a driving device for a vibration actuator.

FIG. 1 illustrates a system for controlling a rotation velocity of the vibration actuator in accordance with a velocity command from a command setting section (not shown). An AC voltage generating section (AC voltage applying section) 2 configured to generate a four-phase AC voltage in response to a drive period command includes a drive signal generator 21 and a driver 22.

The drive signal generator 21 generates a gate signal in response to the drive period command. The driver 22 applies AC voltages $\phi A$, $\phi B$, $-\phi A$, and $-\phi B$ having a phase difference of 90 degrees to piezoelectric elements $1a$, $1b$, $1a-$, and $1b-$, respectively, in accordance with the gate signals. The illustration of the piezoelectric elements $1a-$ and $1b-$ and the AC voltages $-\phi A$ and $-\phi B$ is omitted for simplification.

The AC voltages $\phi A$, $\phi B$, $-\phi A$, and $-\phi B$ are signals after passing through an inductor (not shown), and high-frequency components thereof are removed by the filter effect in combination with capacitive components of the piezoelectric elements $1a$, $1b$, $1a-$, and $1b-$. The AC voltages $\phi A$, $\phi B$, $-\phi A$, and $-\phi B$ therefore have a smooth AC waveform based on the velocity command.

The arrow indicated by the thick line in FIG. 1 is a vector signal, representing that the gate signal is made up of four signals corresponding to four-phase driving, for example.

The rotation velocity of a rotor (not shown) is detected by a velocity detector 12 such as a rotary encoder.

A control section 3 includes a subtractor 31 and a controller 32. The subtractor 31 calculates a difference between a velocity detection signal and the velocity command from the command setting section (not shown). Based on the calculated difference signal, the controller 32 feedback-controls the AC voltage frequency (hereinafter referred to as "drive frequency") by known PID control or other control methods. In an actual case, it is better to handle the period, which is the reciprocal of the frequency. The controller 32 can therefore be configured to output a drive period as the reciprocal of the drive frequency.

In FIG. 1, the system is classified into the AC voltage generating section 2 and the control section 3 in terms of function. In terms of hardware circuit configuration, the control section 3 and the drive signal generator 21 are often made up of digital integrated circuits (digital ICs) such as central processing units (CPUs), application specific integrated circuits (ASICs), or field-programmable gate arrays (FPGAs), and are discriminated from the driver 22 made up of a power IC or a discrete circuit. Therefore, the control section 3 and the drive signal generator 21 are constituted of a digital circuit. An alternative structure may be applied in which the control section 3 is an analog circuit, the drive signal generator 21 is a digital circuit, and an A/D convertor is provided between the control section 3 and the drive signal generator 21.

However, those system configurations are merely an example, and the present invention is not intended to be limited to the above-mentioned configurations as long as similar functions are realized. When the control section 3 and the drive signal generator 21 are constituted of a digital circuit as described above, an advantage is seen such as a securement of frequency resolution. When the control section 3 and the drive signal generator 21 are analog circuits, despite a disadvantage in safety of the circuit, etc., in principle problems of frequency do not occur. When the control section 3 and the drive signal generator 21 are digital circuits, however, since operation velocity of the whole system is limited by frequency of a system clock, problems can occur in reproducing, by PWM, voltage signal having relatively high frequency, such as a driving waveform (applied voltage waveform) of a vibration actuator. Specifically, when PWM period is shortened in view of distortion reduction of driving waveform which is desirably to be a sine waveform, frequency resolution, in other words, resolution of the controlled velocity, is deteriorated. On the other hand, when the PWM period is lengthened in view of frequency resolution enhancement, distortion of the driving waveform is deteriorated. In other words, a distortion reduction of driving waveform and an enhanced frequency resolution are incompatible in a digital circuit. While a system clock having extremely high frequency can solve the problem, it is impractical to utilize it because of the radiation noise or cost. Solving the problem without increasing system clock is one of the advantages of the present invention.

Figure 2:
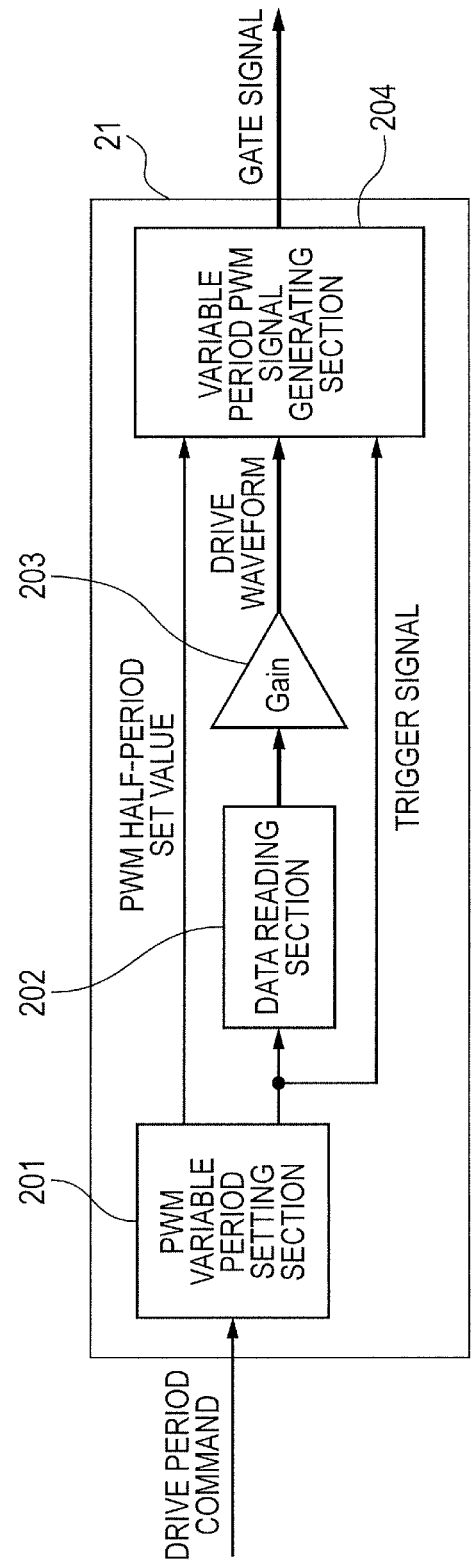
FIG. 2 is a block diagram illustrating an exemplary configuration of a drive signal generator.

FIG. 2 is a block diagram illustrating an internal configuration of the drive signal generator 21. The drive signal generator 21 is a digital circuit and variably controls at least the frequency or the amplitude of an application voltage to be applied to the vibration member. A PWM variable period setting section 201 outputs, based on the drive period command from the control section 3, an optimum PWM half-period set value for every PWM half period, and a trigger signal indicating an update timing of the PWM half-period set value. A data reading section (drive waveform information output section) 202 has multiple pieces of fixed phase information for forming a sine wave, and sequentially outputs the pieces of fixed phase information in synchronization with the above-mentioned trigger signal.

The sine wave signal output from the data reading section 202 is adjusted to have a desired gain by a multiplier 203, and the resultant signal is transferred to a variable period PWM signal generating section 204. The variable period PWM signal generating section 204 outputs a PWM-controlled gate signal having a variable period based on the above-mentioned PWM half-period set value, the sine wave signal having the adjusted gain, and the trigger signal.

A triangular wave is used as a PWM carrier in this embodiment, and hence the value of a PWM half period is treated, and the trigger signal corresponds to an update timing of the PWM half period. In the case where a sawtooth wave is used as a PWM carrier, the value of a PWM full period is treated instead of the PWM half period, and the update timing of the trigger signal is set to be a PWM full period.

Although 32 pieces of fixed phase data are used to form a sine wave in this embodiment, only 8 pieces of fixed phase data are required, in other words, the amount of data is reduced to ¼ if data in the other quadrants than the first quadrant is calculated based on data in the first quadrants.

Figure 3:
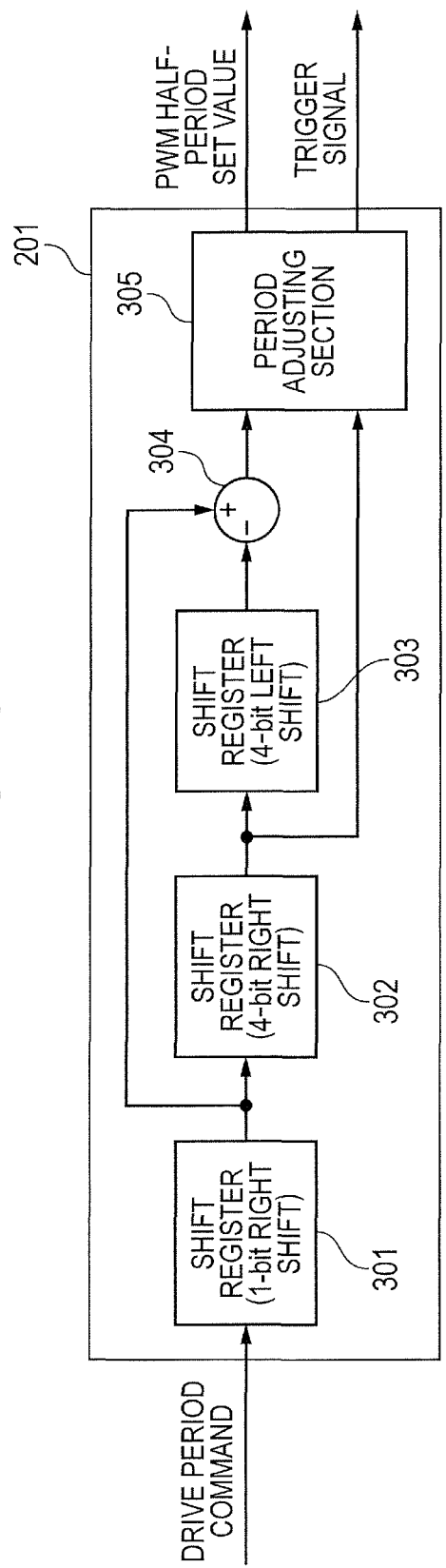
FIG. 3 is a block diagram illustrating an exemplary configuration of a PWM variable period setting section.

FIG. 3 is a block diagram illustrating an internal configuration of the PWM variable period setting section 201. The PWM variable period setting section 201 sets a value of the PWM half period so that an average value of PWM periods in one target period of the application voltage is one fraction of an integral of the target period by variably adjusting the PWM period in an aperiodic manner. The value of an input drive period command is halved by a shift register 301 that performs 1-bit right shift, and an ideal value of a drive half period is calculated. The calculated value is multiplied by ¹⁄₁₆ by a shift register 302 that performs 4-bit right shift, and is set as a reference value of a PWM half period. In the calculation of this embodiment, the values after the decimal point are all rounded down.

Next, the reference value is multiplied by 16 by a shift register 303 that performs 4-bit left shift, and is set as a reference value of the drive half period. This corresponds to a drive half period obtained when a typical fixed period PWM is performed.

In this embodiment, ¹⁄₁₆ of the drive period is set as the PWM period, and the values after the decimal point are rounded down as described above, and hence an error of at most 15 (an output of a subtractor 304 of FIG. 3) occurs between the ideal value and the reference value of the drive half period. This is responsible for the deterioration in resolution with respect to the drive frequency (period). In order to eliminate the error to ensure the frequency resolution, a period adjusting section 305 randomly increments the reference value of the drive half period by 1 as many times as indicated by the error among 16 PWM full periods present in one drive period, and outputs the resultant value as a PWM half-period set value.

For example, in the case where the system clock that determines the operating velocity of the entire system is 200 MHz and the drive frequency to be set is 38 kHz, the corresponding drive period command is a value of 5,263. In this case, the ideal value of the drive half period is 2,631, and the reference value of the PWM half period is 164. The value 164 is multiplied by 16 to calculate the reference value of the drive half period of 2,624, which has an error of 7 with the ideal value. Then, the period adjusting section 305 operates to randomly select 7 PWM periods out of 16 PWM periods and set the PWM half-period set values for the selected PWM periods to 165 and the PWM half-period set values for the remaining 9 (16−7) PWM periods to 164. Consequently, an actual drive half period is determined as 164×9+165×7=2,631, and hence the error with the ideal value can be eliminated to avoid the deterioration in frequency resolution caused by PWM. The purpose of randomly selecting which PWM half period is to be incremented by 1 is to prevent the occurrence of a phenomenon that a specific frequency component is superimposed as in the case of periodically selecting which PWM half period is to be incremented by 1.

The above description has exemplified the case where the PWM period is variably adjusted as appropriate by incrementing the PWM period by 1 as many times as the number corresponding to an error caused by shift calculation among an integer number of PWM periods present in the target period of the application voltage, but the present invention is not limited thereto. The PWM period may be decremented by 1 to variably adjust the PWM period as appropriate.

Figure 4:
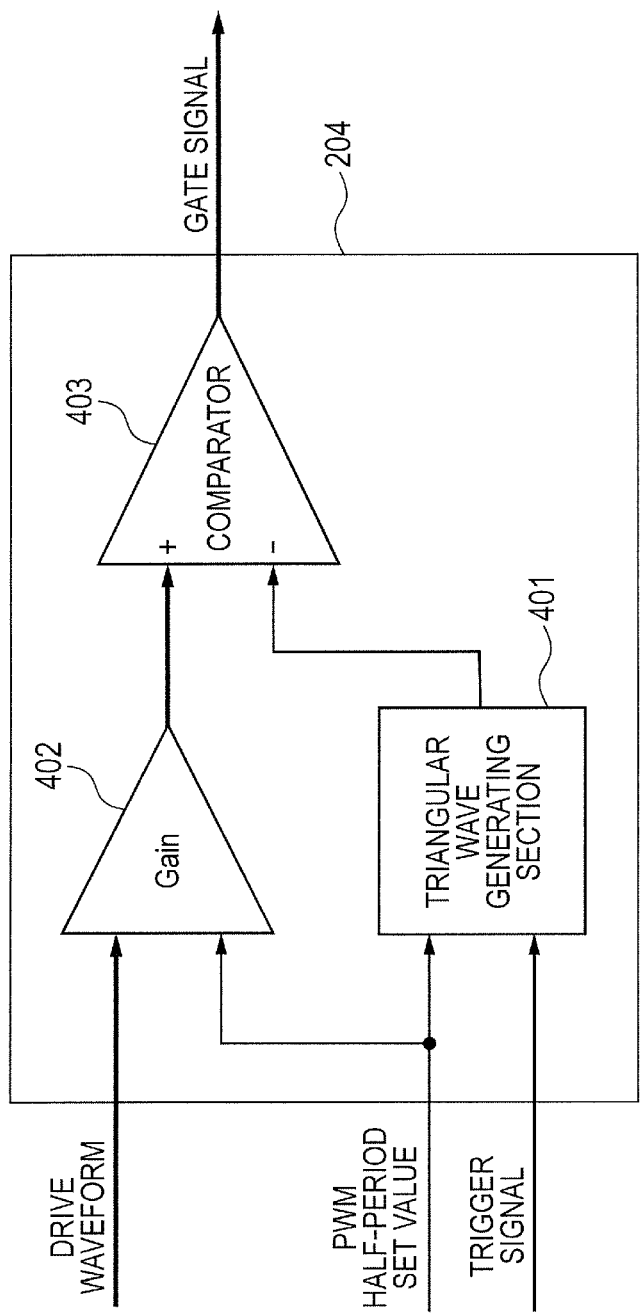
FIG. 4 is a block diagram illustrating an exemplary configuration of a variable period PWM signal generating section.

FIG. 4 is a block diagram illustrating an internal configuration of the variable period PWM signal generating section 204. Based on the PWM half-period set value and the trigger signal that are input from the PWM variable period setting section 201, a triangular wave generating section 401 generates a variable period triangular wave serving as a carrier for generating a gate signal as a variable period PWM signal. The drive waveform, which is a sine wave signal, is subjected to gain adjustment corresponding to the randomly-changing PWM half-period by a multiplier 402. After that, the magnitude relation with the triangular wave is compared by a comparator 403. In this manner, the gate signal as the variable period PWM signal is generated.

Figure 5:
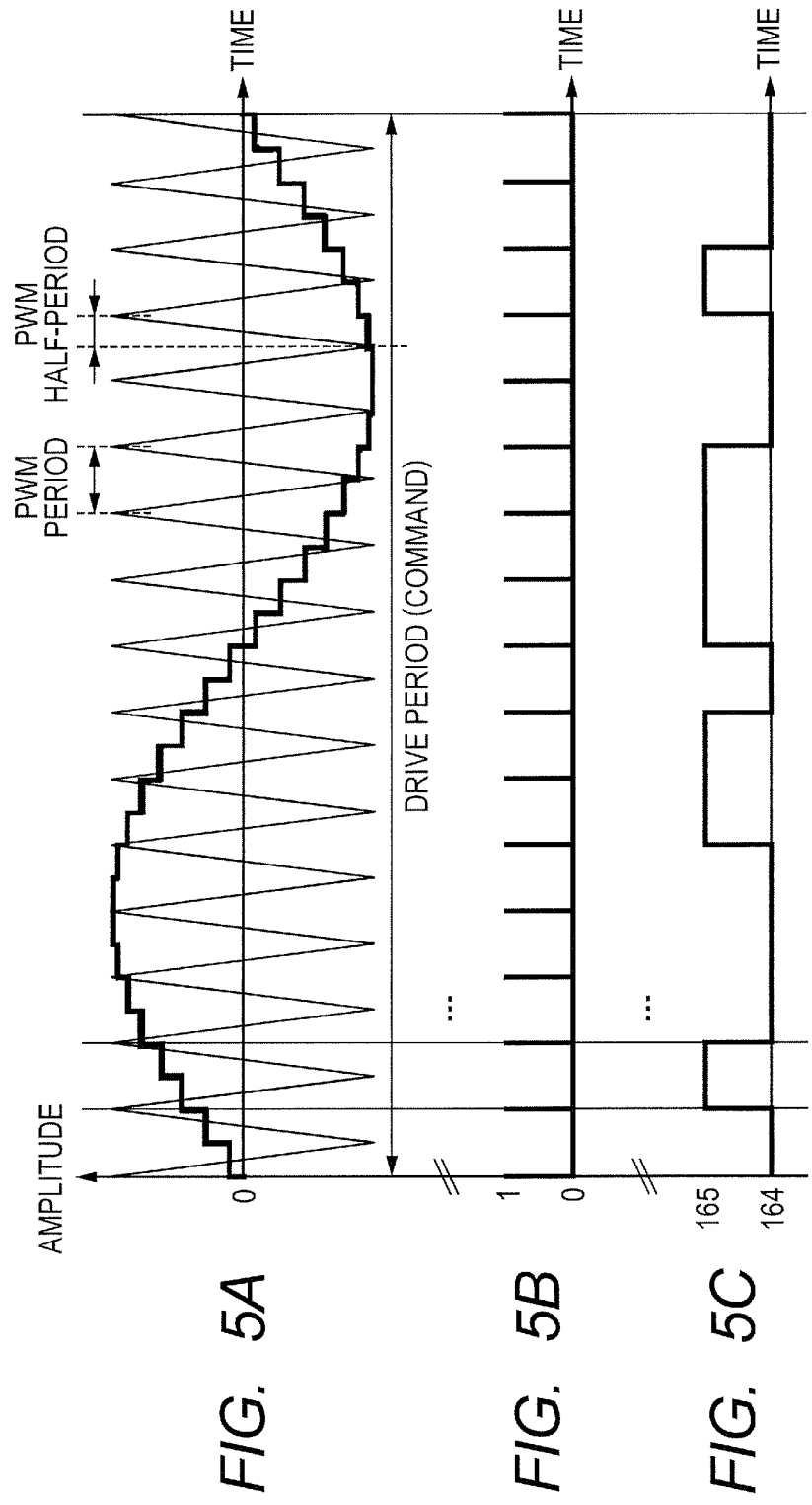
FIGS. 5A, 5B, and 5C are schematic diagrams showing a relationship of various kinds of signals.

FIGS. 5A, 5B, and 5C show the relationship of various kinds of signals generated based on the above-mentioned operation in the range of one drive period.

FIG. 5A shows a process of generating a variable period PWM signal, in which the thin solid line represents an output of the triangular wave generating section 401 and the thick solid line represents a drive waveform input to the variable period PWM signal generating section 204. FIG. 5B shows the trigger signal output from the period adjusting section 305, and FIG. 5C shows the PWM half-period set value similarly output from the period adjusting section 305. The numerical values such as 164 and 165 are based on the above-mentioned example. The PWM half-period set value of FIG. 5C is adjusted randomly a desired number of times by the period adjusting section 305.

As described above, by performing the variable period PWM with the use of fixed phase information for sine waves, it is possible to obtain a PWM drive (gate) signal capable of applying a sine wave voltage to a vibrator with a satisfactory distortion factor with the use of a less amount of data without lowering the frequency resolution with respect to the velocity command. In this manner, highly-accurate drive control for a vibration actuator can be realized at low cost.

Second Embodiment

A second embodiment of the present invention is now described for different exemplary configurations of the driving device and the driving circuit for a vibration actuator from those in the first embodiment.

The second embodiment is similar to the first embodiment in basic configuration, except that an arbitrary waveform is superimposed in synchronization. Overlapping description of the first embodiment is therefore omitted. In this embodiment, the drive signal generating section includes a synchronizing section configured to synchronize arbitrary waveform information sampled at a fixed period with an output timing of drive waveform information synchronized with a trigger signal from the drive waveform information output section.

Figure 6:
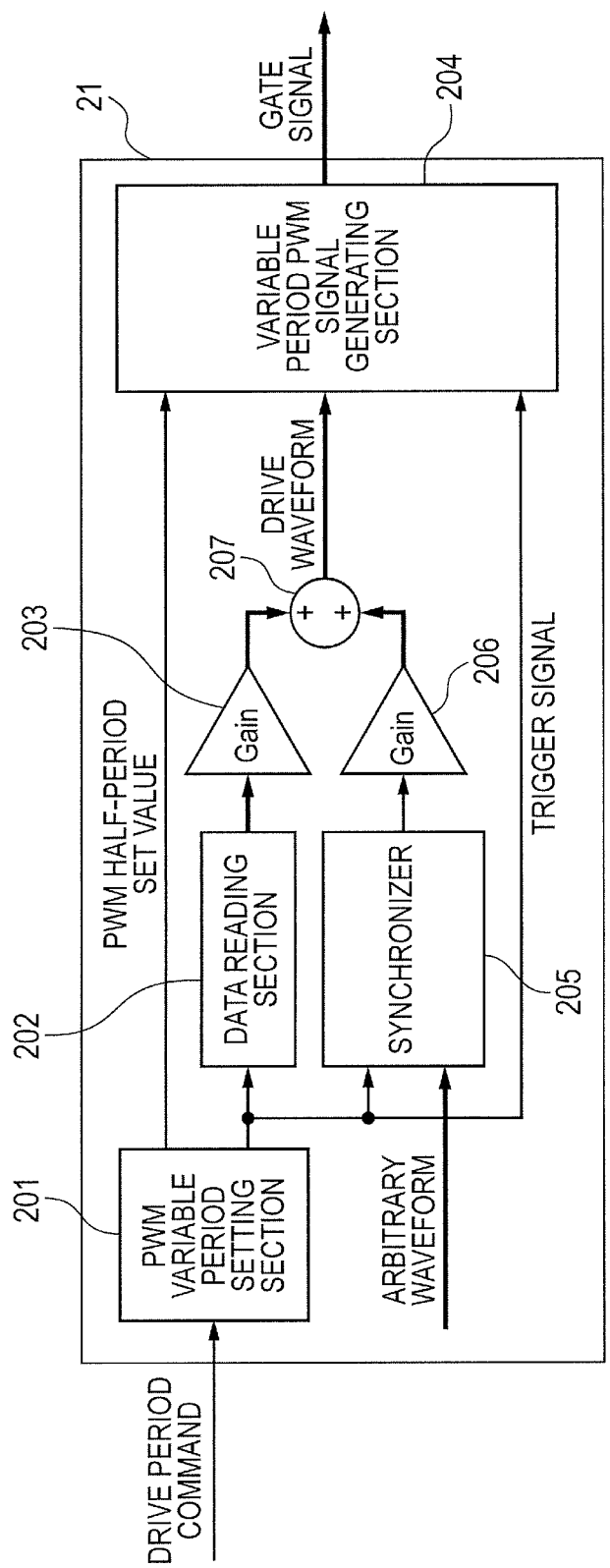
FIG. 6 is a block diagram illustrating another exemplary configuration of the drive signal generator.

FIG. 6 is a block diagram illustrating an internal configuration of the drive signal generator 21 according to this embodiment.

As opposed to the configuration of FIG. 2 described in the first embodiment, the drive signal generator 21 is additionally provided with arbitrary waveform data supplied from an external device (not shown), a synchronizer 205 configured to input the arbitrary waveform data, a multiplier 206, and an adder 207. The synchronizer 205 synchronizes arbitrary waveform data sampled at a predetermined fixed period with data corresponding to variable period sampling based on a trigger signal, in other words, performs variable sampling rate conversion, which is the feature of this embodiment. The synchronized arbitrary waveform signal output from the synchronizer 205 is adjusted to have a desired gain by the multiplier 206, and is added by the adder 207 with sine wave data that has passed through the multiplier 203 from the data reading section 202. The resultant signal is thereafter transferred to the variable period PWM signal generating section 204. The pieces of arbitrary waveform data in number corresponding to the number of driver circuits, that is, four phases in this embodiment, can be individually used.

Figure 7:
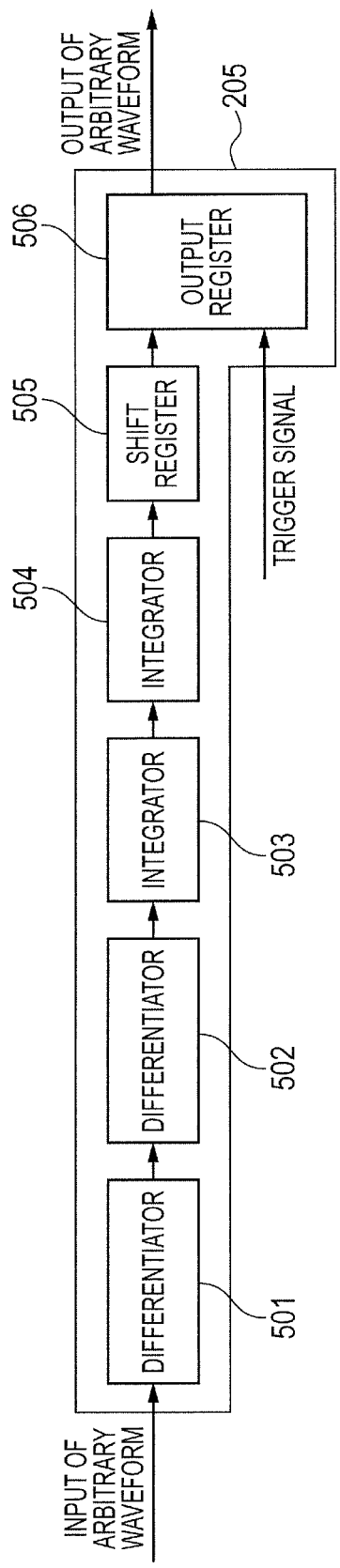
FIG. 7 is a block diagram illustrating an exemplary configuration of a synchronizer.

Next, the configuration and operation of the synchronizer 205 are described with reference to FIG. 7.

The synchronizer 205 includes differentiators 501 and 502, integrators 503 and 504, and a shift register 505, which form a CIC filter, and an output register 506 configured to output data in synchronization with an operating timing of the period variable PWM based on the trigger signal. The CIC filter is used for sampling rate conversion. In this embodiment, a two-stage CIC filter having two series-connected differentiators and two series-connected integrators is used. The differentiators 501 and 502 operate at the same fixed sampling period as that of the arbitrary waveform data, and the integrators 503 and 504 operate at the system clock. In this manner, data interpolation at the system clock period can be performed.

The CIC filter is required to perform gain adjustment corresponding to the product between a quotient of dividing the operating clock of the integrator by the operating clock of the differentiator and the number of stages. The shift register 505 has the role of this gain adjustment, and shifts the digits to the right by a number equivalent to a value obtained by multiplying an input by the reciprocal of the product of a multiple number of the fixed sampling period of the arbitrary waveform data and the system clock period and the number of stages of the CIC filter. For example, when the system clock is 200 MHz similarly to the first embodiment, and the fixed sampling period of the arbitrary waveform data is 640 nsec, which is 128 times of the system clock period (5 nsec), the shift register 505 shifts the input to the right by "7 bits×2 stages=14 bits". This operation is equivalent to multiplying the input by 1/(128×128).

The shift register is used for simple description, but actually, by employing a circuit configuration in which the reading position of a register having a sufficient number of digits is appropriately set, the operation equivalent to the shift operation can be performed at the system clock period at high velocity. The output register 506 updates data when the trigger signal is input, and hence the input signal to the output register 506 whose input data is updated at the system clock period is output as an arbitrary waveform in synchronization with the trigger signal.

FIGS. 8A, 8B, 8C, 8D, 8E, 8F, and 8G show an exemplary operation of the synchronizer 205 based on the above description.

Figure 8A:
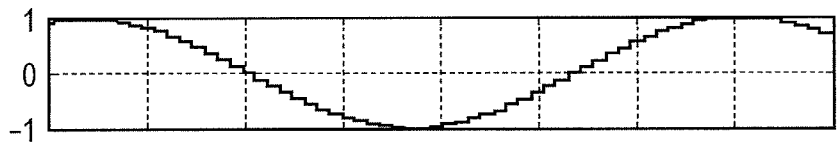
FIGS. 8A, 8B, 8C, 8D, 8E, 8F, and 8G are graphs showing waveforms of input/output and internal signals of the synchronizer.
Figure 8B:
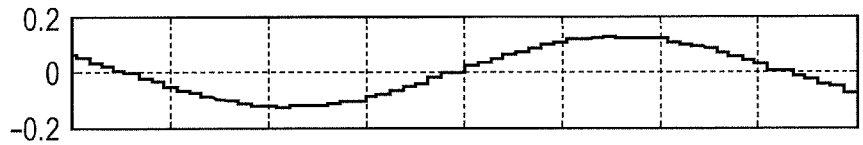
Figure 8C:
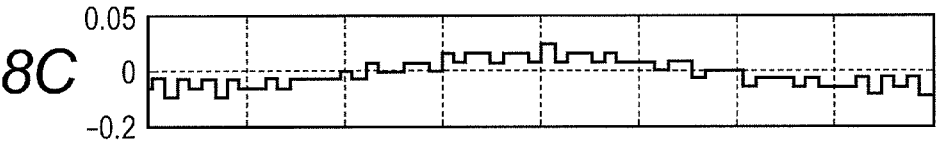
Figure 8D:
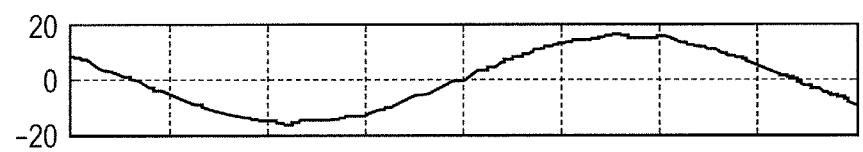
Figure 8E:
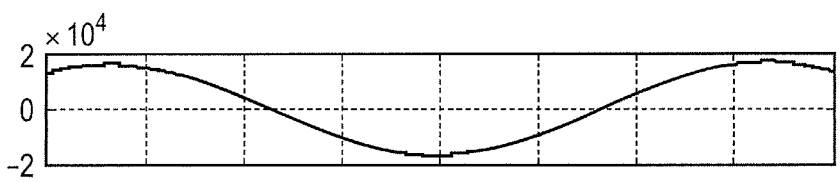
Figure 8F:
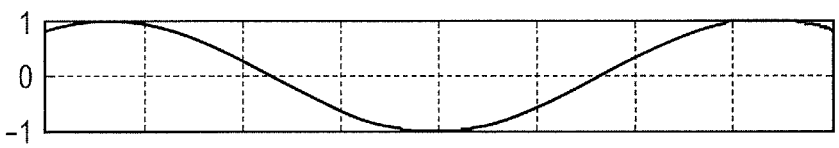
Figure 8G:
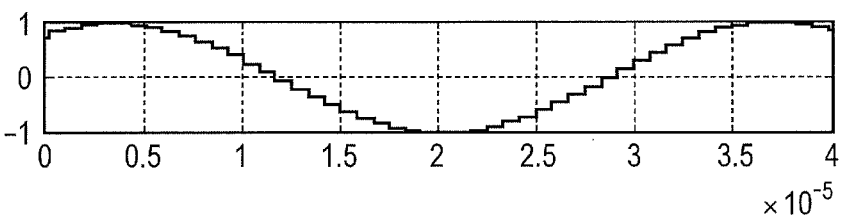

FIG. 8A is arbitrary waveform data to be input to the synchronizer 205. In this example, the arbitrary waveform data is a 30 kHz sine wave sampled at the above-mentioned period of 640 nsec. FIG. 8B is an output waveform of the differentiator 501. FIG. 8C is an output waveform of the differentiator 502. FIG. 8D is an output waveform of the integrator 503. FIG. 8E is an output waveform of the integrator 504. FIG. 8F is an output waveform of the shift register 505. FIG. 8G is an output waveform of the output register 506.

The arbitrary waveform data of FIG. 8A is differentiated twice at an input sample period to be the output waveform of FIG. 8C, and is subsequently integrated twice at a system clock period to be the output waveform of FIG. 8E. It is understood that the resultant output waveform of FIG. 8E is interpolated at the system clock period as compared to the original input waveform of FIG. 8A and that amplitude adjustment is necessary.

The output waveform of FIG. 8F is the result of amplitude adjustment by 14-bit shift, and has the original amplitude. Finally, the output waveform of FIG. 8F is synchronized with a subsequent-stage operating timing based on the trigger signal, to be the output waveform of FIG. 8G. It is understood that low-distortion variable rate conversion is realized by the synchronizer 205.

While this embodiment has exemplified the configuration including the CIC filter as a variable rate conversion section, it is to be understood that the scope of the present invention is not limited thereto and any configuration that realizes similar functions can be used.

According to the configuration in this embodiment, the rotation of the vibration actuator can be controlled with high accuracy by performing the low-distortion sine wave driving described in the first embodiment, and at the same time, a PWM drive (gate) signal having an arbitrary waveform superimposed on the driving signal with a low distortion factor can be obtained. By appropriately preparing an arbitrary waveform, for example, a random noise signal can be superimposed on the driving signal to measure transmission characteristics of the vibration actuator, or a sine wave signal having a frequency different from the drive frequency or an impulse signal can be superimposed on the driving signal to analyze vibration characteristics of the vibration actuator.

As described above, arbitrary waveform data having an arbitrary fixed sampling period can be synchronized with a system operating period by variable rate conversion with the use of the synchronizer, to thereby superimpose the arbitrary waveform data on a variable period PWM sine wave drive signal without deteriorating a distortion factor. Consequently, the driving of a vibration actuator can be controlled by performing low-distortion sine wave driving and superimposing an arbitrary waveform with a low distortion factor.

According to the present invention, it is possible to realize the driving device and the driving circuit for a vibration actuator, which are configured to perform low-distortion sine wave driving and perform stable drive control at low cost.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-135647, filed Jun. 15, 2012, which is hereby incorporated by reference herein in its entirety.

What is claimed is:

1. A driving device for a vibration actuator, comprising an AC voltage applying section comprising a drive signal generating section configured to variably control at least one of a frequency and an amplitude of an application voltage to be applied to a vibration member of the vibration actuator,
the drive signal generating section comprising:
a variable period setting section configured to output a value of a PWM period, the value being set so that an average value of PWM periods in one target period of the application voltage is one fraction of an integer number of the target period by variably adjusting the PWM periods in an aperiodic manner;
a drive waveform information output section configured to output drive waveform information of the application voltage, the drive waveform information being generated with use of fixed phase information for a sine wave; and
a variable period PWM signal generating section configured to generate a PWM signal having a variable period based on the set value of the PWM period output from the variable period setting section and the drive waveform information output from the drive waveform information output section,
wherein the drive signal generating section is a digital circuit.

2. A driving device for a vibration actuator according to claim 1, wherein the variable period setting section variably adjusts the PWM period by one of incrementing and decrementing the PWM period by 1 as many times as a number corresponding to an error caused by shift calculation among the integer number of the PWM periods present in the target period of the application voltage.

3. A driving device for a vibration actuator according to claim 1,
wherein the variable period setting section is further configured to output a trigger signal indicating an update timing of the set value of the PWM period; and
wherein the drive waveform information output section is further configured to output the drive waveform information in synchronization with the trigger signal, and
wherein the variable period PWM signal generating section is further configured to generate the PWM signal based on the set value of the PWM period, the trigger signal, and the drive waveform information.

4. A driving device for a vibration actuator according to claim 3, wherein the drive signal generating section comprises a synchronizing section configured to synchronize arbitrary waveform information sampled at a fixed period with output timings of the drive waveform information synchronized with the trigger signal, to thereby obtain a PWM drive signal having an output of the synchronizing section superimposed on the drive waveform information.

5. A driving device for a vibration actuator according to claim 4, wherein the synchronizing section comprises a CIC filter.

6. A driving device for a vibration actuator according to claim 1, wherein the vibration actuator comprises:
the vibration member configured to excite a vibration wave when applied with an AC voltage from the AC voltage applying section; and
a moving member configured to be one of brought into contact with the vibration member and indirectly connected to the vibration member, the moving member being movable relative to the vibration member by a frictional force generated by the vibration wave.

7. A driving circuit for a vibration actuator, comprising an AC voltage applying section comprising a drive signal generating section configured to variably control at least one of a frequency and an amplitude of an application voltage to be applied to a vibration member,
the drive signal generating section comprising:
a variable period setting section configured to output a value of a PWM period, the set value being set so that an average value of PWM periods in one target period of the application voltage is one fraction of an integer number of the target period by variably adjusting the PWM periods in an aperiodic manner;
a drive waveform information output section configured to output drive waveform information of the application voltage, the drive waveform information being generated with use of fixed phase information for a sine wave; and
a variable period PWM signal generating section configured to generate a PWM signal having a variable period based on the set value of the PWM period output from the variable period setting section and the drive waveform information output from the drive waveform information output section,
wherein the drive signal generating section is a digital circuit.

8. A driving circuit for a vibration actuator according to claim 7, wherein:
the variable period setting section is further configured to output a trigger signal indicating an update timing of the set value of the PWM period, and
wherein the drive waveform information output section is further configured to output the drive waveform information in synchronization with the trigger signal, and the variable period PWM signal generating section is further configured to generate the PWM signal based on the set value of the PWM period, the trigger signal, and the drive waveform information.

9. A driving circuit for driving a vibration actuator according to claim 7, wherein the vibration actuator comprises:
the vibration member configured to excite a vibration wave when applied with an AC voltage from the AC voltage applying section; and
a moving member configured to be one of brought into contact with the vibration member and indirectly connected to the vibration member, the moving member being movable relative to the vibration member by a frictional force generated by the vibration wave.

* * * * *